No. 679,729. Patented Aug. 6, 1901.
O. H. P. CORNELL.
MACHINE FOR MAKING AND DRIVING STAPLES.
(Application filed Dec. 28, 1900.)
(No Model.) 7 Sheets—Sheet 1.

Witnesses
Franck L. Durand
W. Parker Rinehl

Inventor
O. H. P. Cornell
by D. C. Rinehl
Attorney

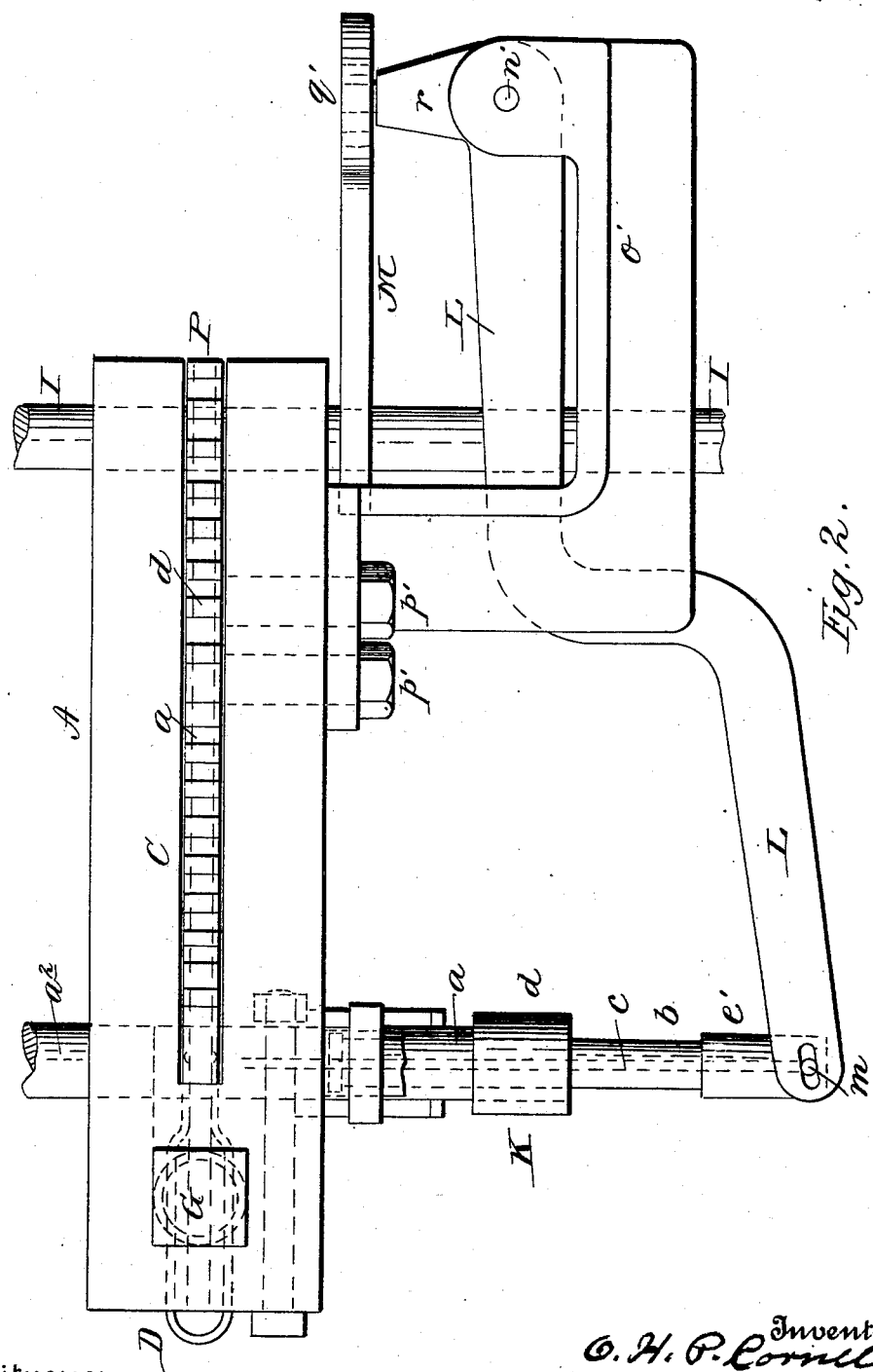

No. 679,729. Patented Aug. 6, 1901.
O. H. P. CORNELL.
MACHINE FOR MAKING AND DRIVING STAPLES.
(Application filed Dec. 28, 1900.)
(No Model.) 7 Sheets—Sheet 3.
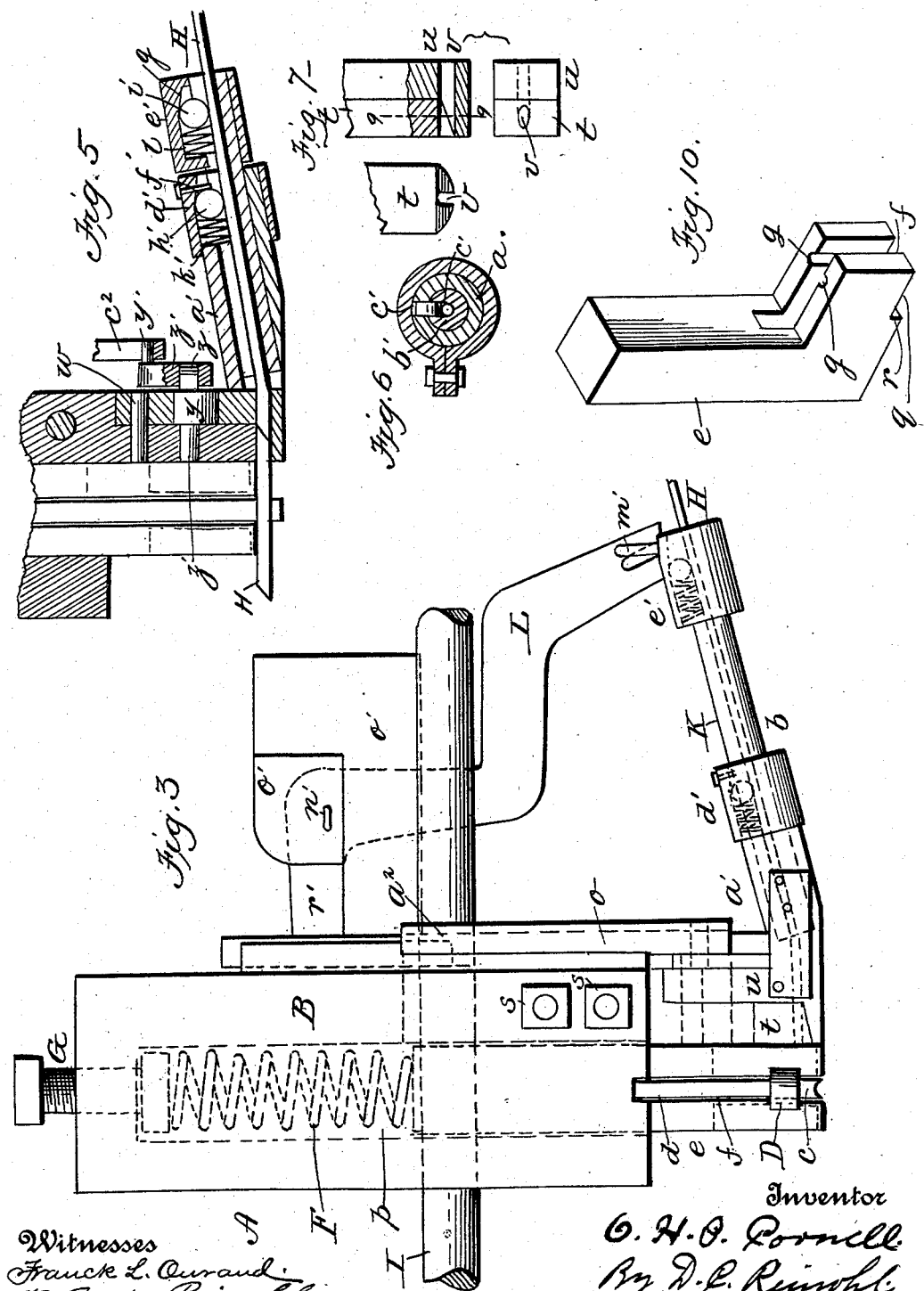

No. 679,729. Patented Aug. 6, 1901.
O. H. P. CORNELL.
MACHINE FOR MAKING AND DRIVING STAPLES.
(Application filed Dec. 28, 1900.)
(No Model.) 7 Sheets—Sheet 4.
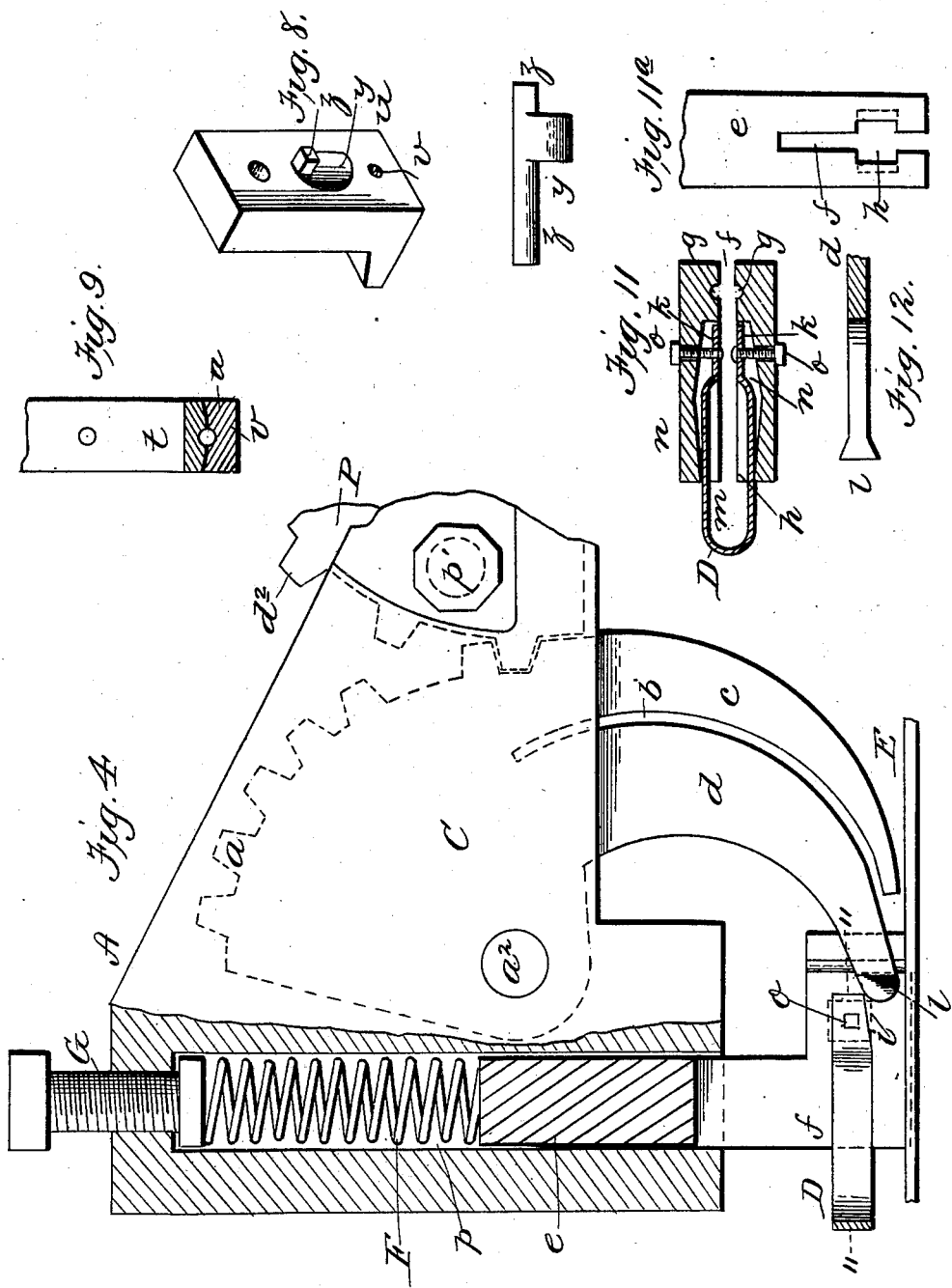

No. 679,729. Patented Aug. 6, 1901.
O. H. P. CORNELL.
MACHINE FOR MAKING AND DRIVING STAPLES.
(Application filed Dec. 28, 1900.)
(No Model.) 7 Sheets—Sheet 5.
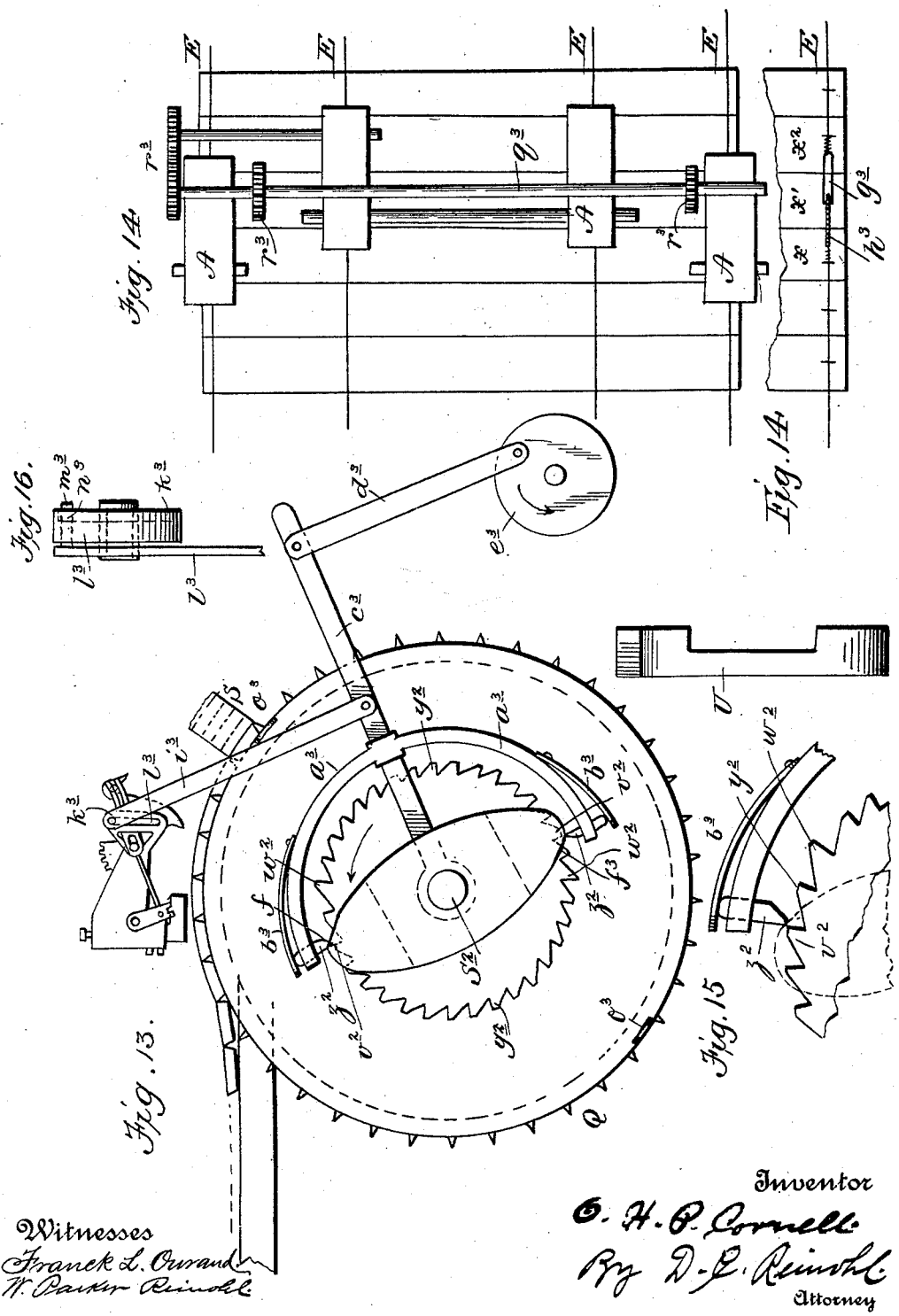
Witnesses
Franck L. Ourand
W. Parker Reindl
Inventor
O. H. P. Cornell
By D. P. Reindl
Attorney No. 679,729. Patented Aug. 6, 1901.
O. H. P. CORNELL.
MACHINE FOR MAKING AND DRIVING STAPLES.
(Application filed Dec. 28, 1900.)
(No Model.) 7 Sheets—Sheet 6.

Witnesses
Franck L. Durand
W. Parker Reinohl

Inventor
O. H. P. Cornell
By D. F. Reinohl
Attorney

No. 679,729. Patented Aug. 6, 1901.
O. H. P. CORNELL.
MACHINE FOR MAKING AND DRIVING STAPLES.
(Application filed Dec. 28, 1900.)
(No Model.) 7 Sheets—Sheet 7.

UNITED STATES PATENT OFFICE.

OLIVER H. P. CORNELL, OF BROOKLYN, NEW YORK.

MACHINE FOR MAKING AND DRIVING STAPLES.

SPECIFICATION forming part of Letters Patent No. 679,729, dated August 6, 1901.

Application filed December 28, 1900. Serial No. 41,664. (No model.)

*To all whom it may concern:*

Be it known that I, OLIVER H. P. CORNELL, a citizen of the United States, residing at Brooklyn, in the county of Kings and State of New York, have invented certain new and useful Improvements in Machines for Making and Driving Staples; and I do hereby declare the following to be a full, clear, and exact description of the invention, such as will enable others skilled in the art to which it appertains to make and use the same.

This invention relates to the art of making barrels, has especial reference to that class of barrels known to the trade as "knockdown," has for its object a machine for attaching wire hoops to the staves by staples which are made and driven by the same machine, and consists in certain improvements, which will be fully disclosed in the following specification and claims.

Figure 1:
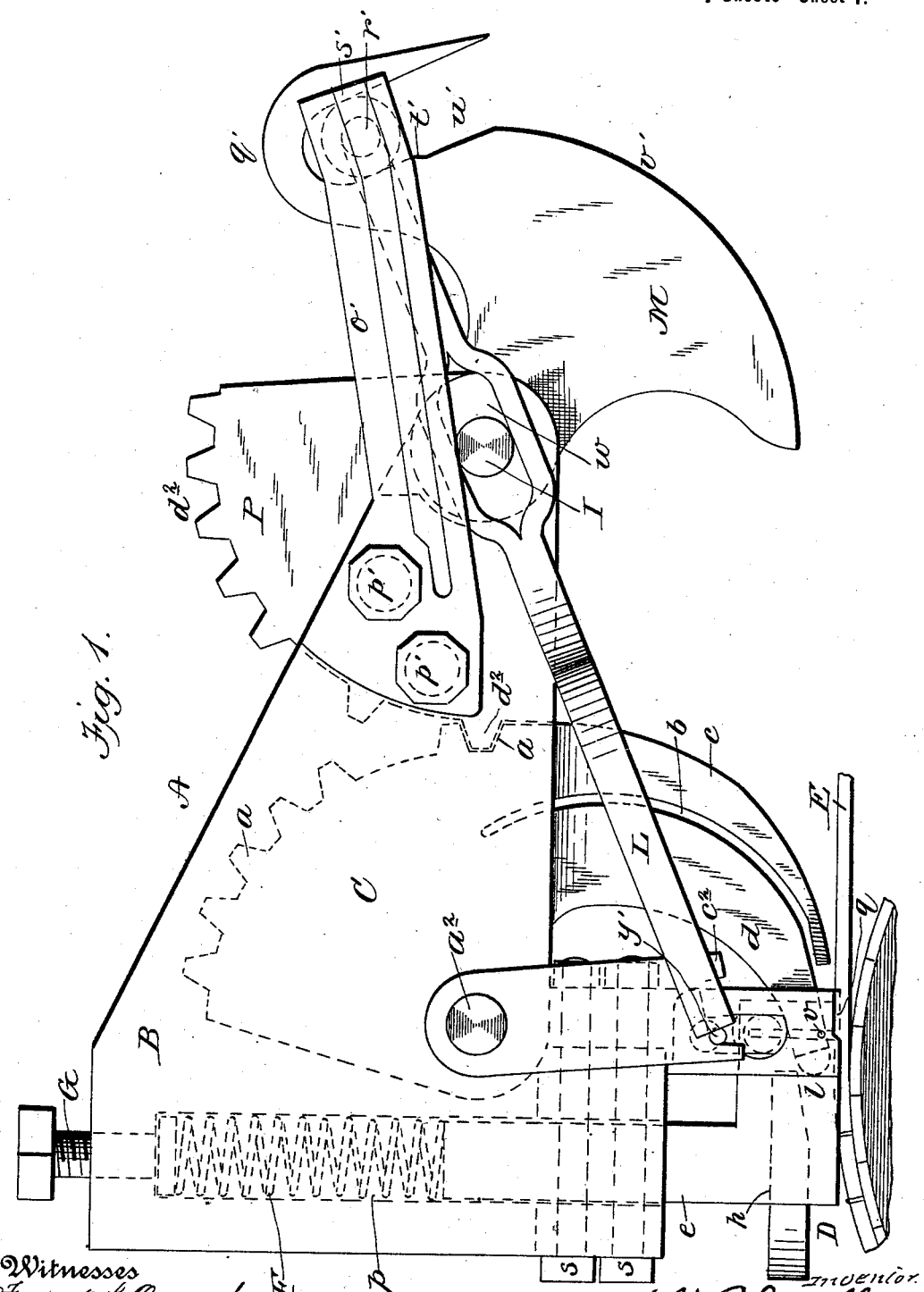
Figure 18:
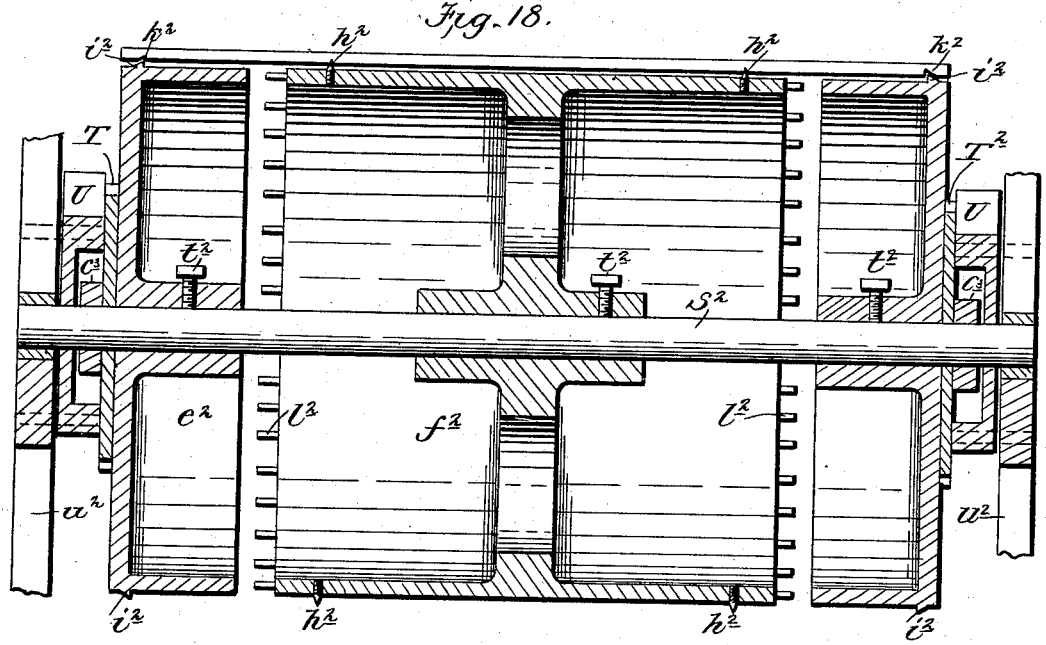
Figure 19:
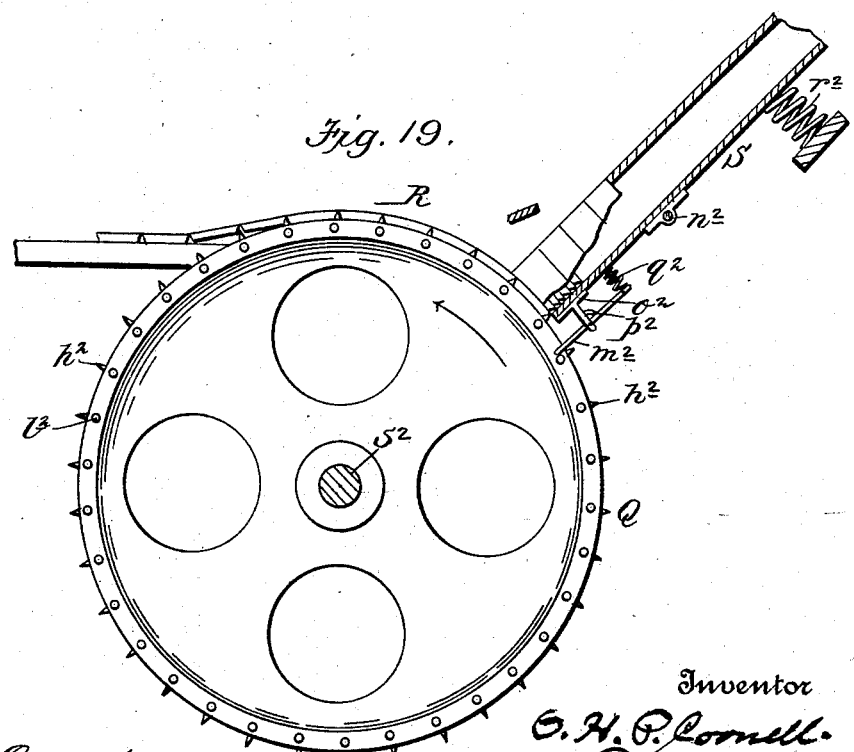
Figure 20:
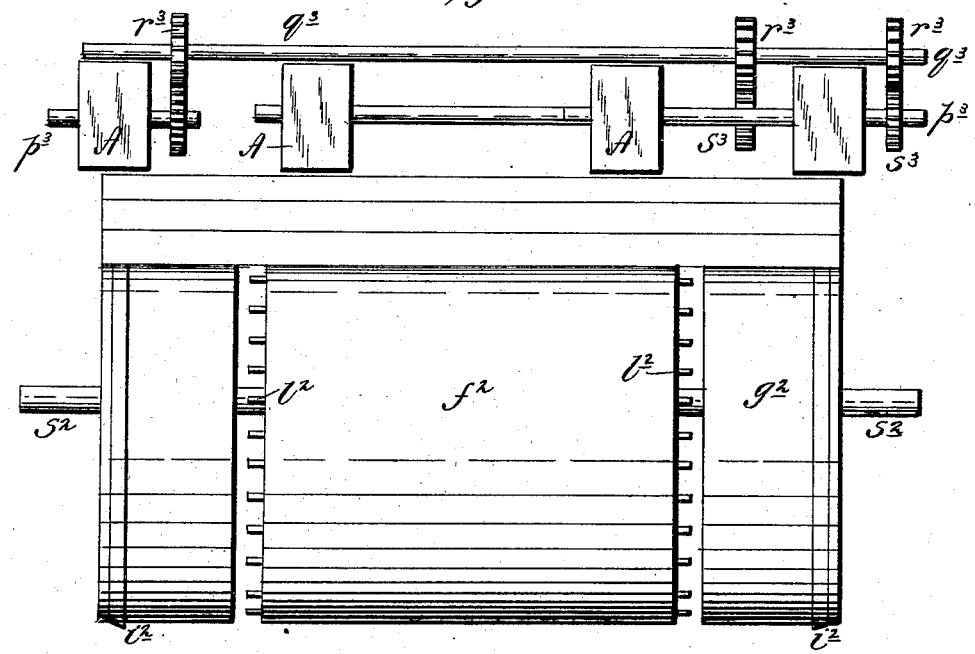
Figure 21:
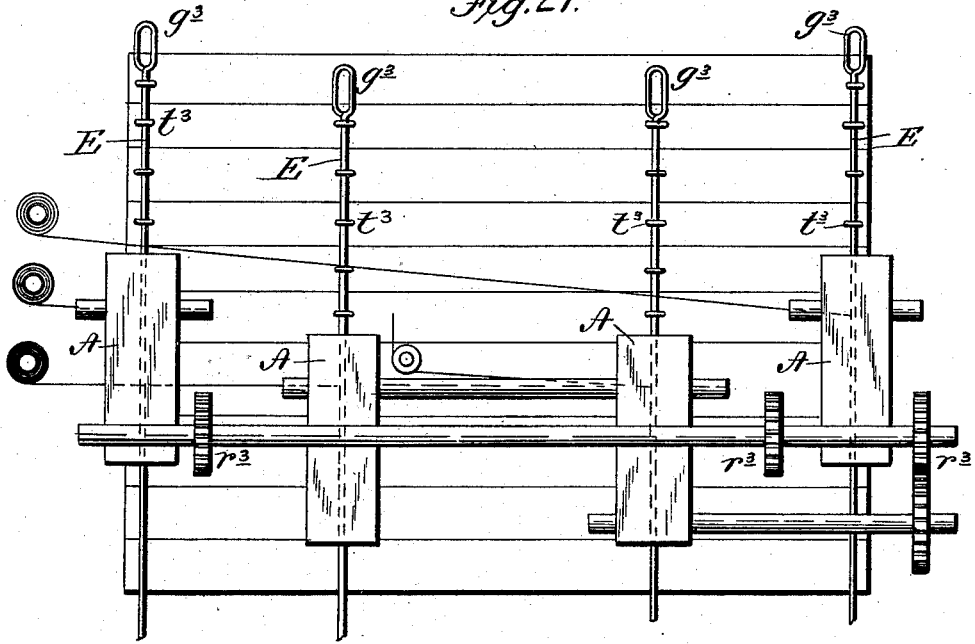

In the accompanying drawings, which form part of this specification, Figure 1 represents a side elevation of my improved machine for making and driving staples; Fig. 2, a top plan view of the same; Fig. 3, a rear elevation; Fig. 4, a side elevation, partly in section; Fig. 5, a vertical section of the staple-wire feed; Fig. 6, a transverse section on line 6 6, Fig. 5. Fig. 7 represents a detail view of the movable and the stationary dies; Fig. 8, a perspective of the movable die; Fig. 9, a cross-section of movable dies on line 9 9, Fig. 7; Fig. 10, a perspective of the guide presser-foot; Fig. 11, a horizontal section on line 11 on Fig. 4; Fig. 11$^a$, an end view of the presser-foot with the trip removed; Fig. 12, a plan of the end of the staple-driver; Fig. 13, an end view of the stave-assembling drum; Fig. 14, a top plan showing the staves on the drum with a battery of stapling-machines in position and connected; Fig. 14$^a$, a plan view of a section of a barrel-mat, showing one hoop secured thereto; Fig. 15, an enlarged detail view of the drum feed mechanism; Fig. 16, an end elevation of the lever for operating the staple-machine detached; Fig. 17, a front view of the tripping-cam; Fig. 18, a longitudinal section of the assembling-drum; Fig. 19, a transverse section of the same, showing the stave-feeding mechanism attached; Fig. 20, a front elevation of the same, showing the battery of stapling-machines in position; and Fig. 21, a plan view of the same.

Reference being had to the drawings and the letters thereon, A indicates a machine for bending and driving staples used to secure the hoops to the staves of barrels and in which B is the body of the machine, C a head having gear-teeth $a$ on the outer edge and is provided with a bifurcated jaw separated by a longitudinal slot $b$ into a lower arm $c$, which bends the wire and forms staples, and an upper arm $d$, which drives the staples, a vertically-movable guide presser-foot $e$, having a vertical slot $f$, in which the arms of the jaw rise, and the slot is provided with opposite vertical grooves $g\ g$ to receive the wire as it is bent into a staple and to guide the staple in its descent as it is being driven. The guide presser-foot is also provided with a horizontal slot $h$ in front of and at a right angle to the slot $f$, in which is a spring-trip D, beveled at its front end $i$ for the end of the arm $d$ to slip under and engage the trip and raise the presser-foot to allow the staple-wire to be fed through under the presser-foot. The trip consists of a bifurcated spring contracted at its inner ends $k\ k$ and is laterally separable to allow the laterally-distended end $l$ of the arm $d$ to pass through on its return stroke, and the trip is enlarged laterally at $m$ to allow the arm $d$ to pass through it in its forward and upper stroke as the wire is being bent and the staple formed. To admit of the lateral spread of the trip, the slot $h$ in the presser-foot is enlarged on its sides $n\ n$, and the inner end of the trip D is supported by pins $o\ o$, which pass loosely through the sides of the presser-foot and are secured at their inner ends to the parts $k\ k$ of the trip, which allows said ends to spread laterally for the distended end $l$ of the arm $d$ to pass through on its return stroke. This construction of the presser-foot and the end of the arm $d$ is shown in Figs. 4, 10, 11, 11$^a$, and 12.

The presser-foot $e$ rises in the vertical chamber $p$ in the front of the machine and is moved downward to guide the staple by a helically-coiled spring F, the tension of which is regulated by a screw G, as shown in Figs. 1, 3, and 4, and on the under side of the presser-foot is a recess $q$, the inner end of which forms a shoulder $r$, as shown in Figs. 1 and 10, and prevents the wire H passing this point and where it is operated upon by the arm $c$ and bent upward in the grooves $g$ $g$ of the presser-foot to form a staple.

Secured to the head of the machine by bolts $s$ $s$ is a two-part die for cutting off the wire, $t$ being the stationary part of the die and $u$ the movable part, and both parts are provided with an aperture $v$ for the reception of the wire which is formed into staples, part $u$ being connected to part $v$ by a pivot-bolt $w$, as shown in Figs. 5, 8, and 9, and is operated by a cam $y$ on a shaft $z$ from the shaft $a^2$ through the medium of arm O.

K indicates the wire-feeding device, which delivers the wire to the die and consists of an outer and inner tubular section $a'$ $b'$, telescopically connected, so that the section $b'$ slides into the section $a'$ as it feeds the wire from a suitable source of supply, such as a reel or a roll. The sections $a'$ $b'$ are slotted longitudinally in their upper sides at $c'$, as shown in Fig. 6, and each section is provided with a cage or chamber $d'$ $e'$, and each cage or chamber is provided with an inclined surface $f'$ $g'$, a wire-gripping disk $h'$ $i'$, and a spring $k'$ $l'$ for holding the disk in contact with the inclined surface $f'$ $g'$ and with the wire H as the section $b'$ is reciprocated, the gripping-disks being arranged so that on the outstroke of the section $b'$ the disk $h'$ bites and prevents the wire slipping, and the disk $i'$ is loose or free, so as not to bite on the wire, and on the instroke of section $b'$ the action of the disks is reversed. The outer section of the wire-feed mechanism is reciprocated by a lever L, one end of which engages a pin $m'$, and the opposite end is fulcrumed at $n'$ on a bracket $o'$, secured to the frame of the machine by bolts $p'$ $p'$ and engages the gooseneck $q'$ of the cam M, which is secured to and is vibrated by the main shaft I intermittently to feed the wire H, as required. On the end $r'$ of the lever L is a roller $s'$, and on the cam is a curved surface or dwell $t'$, a straight or flat inclined surface $u'$ adjacent thereto, and a long curved surface or dwell $v'$, over all of which the roller $s'$ travels.

O is an arm pivotally supported on the shaft $a^2$ to vibrate freely and is provided with two fingers $b^2$ $c^2$, which alternately engage the stud $y'$ on the crank $z'$, as will hereinafter more fully appear.

Upon the shaft I is secured a power-transmitter P, which is provided with gear-teeth $d^2$, which correspond and mesh with the teeth $a$ on the head C. It will be observed that this gearing is mutilated—that is to say, the lower teeth are farther apart than the upper teeth—the purpose of which will appear in the description of the operation of the machine.

The normal position of the machine is shown in the drawings, the lower tooth $d^2$ of the transmitter P engaging the lower half-tooth. As the transmitter moves downward the arm $d$ of the jaw runs or is projected under the trip D in the presser-foot $e$ and raises the presser-foot just above the hole $v$ in the die, during which time the roller $s'$ on the end $r'$ of the lever L has moved over the curved surface $t'$ of the cam M to the inclined surface $u'$, at which time the first tooth of the transmitter disengages from the half-tooth on the head and the head stops or stands still while the transmitter moves forward or downward one tooth, causing the roller to travel up the incline $u'$ to the major cam-surface $v'$, which causes the lever L and the feed mechanism to push the wire through the die under the presser-foot $e$ and through the slot $b$ in the jaw the proper distance to form a staple, and during this time the arm O has moved forward, so that the finger $c^2$ has engaged with the crank-pin $y'$ of the die $u$ and the front end of the arm $d$ has passed into the part $m$ of the trip D, allowing the foot to press freely on the wire H in the slot $b$ of the jaw. The wire now lies in the mouth of the slot $b$, held firmly by the presser-foot. As the jaw advances, the finger $c^2$ being against the pin $y'$, it forces the crank around through an arc of about twenty-five degrees, cutting the wire before it reaches the curved portion of the slot $b$. Now as the jaw advances the arm $c$ bends the wire as the arm rises in the slot $f$ in the presser-foot and forms a staple. The spring F now holds the foot down firmly on the staple while the arm $d$ on its return stroke presses it into the stave of the barrel over or astride the hoop. As the reverse motion of the transmitter P and the head C is being made the gooseneck $q'$ engages the roller $s'$, moves the section $b'$ of the wire-feed mechanism outward, and takes a new bite on the wire H, which completes a cycle of the machine.

Q indicates a stave-assembling drum, preferably made in three sections $e^2$, $f^2$, and $g^2$, (see Fig. 20,) on the periphery of which are spurs $h^2$, (see Fig. 18,) which enter the spaces formed by the beveled edges of the staves R and concentric projections $i^2$ $i^2$, which engage the croze $k^2$ at each end of the staves, and on the ends of the section $f^2$ are studs or pins $l^2$, which are engaged by a lever $m^2$ of the automatic stave-feeding device S, which is pivotally secured at $n^2$ to vibrate and deposit the staves successively on the periphery of the drum. The lever $m^2$ is secured to the hopper S by means of a bracket $o^2$, having a stop or arm $p^2$ to limit the stroke of the lever and the vibration of the hopper, and the lever is restored to its normal position by a spring $q^2$, and the hopper itself is returned by a spring $r^2$. The drum is mounted upon a shaft $s^2$, and the sections secured thereto by set-screws $t^2$, and the shaft supported on a suitable frame $u^2$ $u^2$. On one or both ends of the drum is a ratchet-wheel T, which is provided with oppositely-arranged short teeth $v^2$, long teeth $w^2$, and intermediate teeth $y^2$ of uniform length. These teeth are engaged by a ratchet or pawls $z^2$ $z^2$, supported on arms $a^3$ $a^3$ and held in engagement with the teeth by springs $b^3$ $b^3$, and the arms $a^3$ $a^3$ are secured to a lever $c^3$, one end of which engages the shaft $s^2$, and the opposite end is attached to a pitman $d^3$, operated by a crank $e^3$, driven by any suitable connection with the source of power.

U indicates an elliptical cam at one end of the drum, fixed to the frame $u^2$ $u^2$ and provided with straight surfaces $f^3$ $f^3$ at each end and on opposite sides of the cam.

Above and across the assembling-drum are arranged the stapling-machines A A A A, the two end machines in advance of the intermediate machines a distance equal to the width of one stave to secure the hoops E to the staves, so that the loops $g^3$ and the hooks $h^3$ shall not come in line on the barrel and are operated by a bar $i^3$, connected at one end of the lever $c^3$ and at its opposite end to a crank $k^3$, having a slot $l^3$, in which the pin $m^3$ of the bar $i^3$ slides when disengaged from the hole $n^3$, by which operative connection is made between the bar $i^3$ and said crank, the pin being thrown out of the hole $n^3$ intermittently by lugs $o^3$ on the ends of the sections $e^3$ and $g^3$ of the drum Q. The stapling-machines A are connected by shafts $p^3$ $q^3$ and gear-wheels $r^3$ $s^3$ to operate synchronously and drive four staples $t^3$ at the same time.

The operation of the stave-assembling device is as follows: By referring to Fig. 13 it will be noticed that all the teeth in the ratchet T are of the same length except four—two on one side of the ratchet and two on the opposite side—a short tooth $v^2$, a long tooth $w^2$, with a tooth $y^2$ of normal length between them. The drum-cylinder Q is twice the circumference of a barrel the staves of which it is designed to assemble. Consequently to move it forward the exact width of a stave at each movement there are twice as many teeth on the ratchet T as there are staves in the barrel. The hoops E are stapled to the center of each stave except at the ends of the hoops. (See Figs. 14$^a$ and 21.) As the staves of a mat for one barrel are emerging from the machine the loops of the hoops for the staves of the following mat are hooked onto the hook or ratchet end of the hoops of the preceding mat, so that a continuous mat of barrel-staves will be constantly emerging from the machine. To accomplish this, it is necessary as the couplings of the hoops or their hooks and the loops pass over the drum and under the stapling-machines A to drive the staples in other places than the center of the staves—that is, as the hooks of the mat nearing completion approach the stapling-machines the machines drive staples of the front quarter of the stave adjacent to the hook and then jump or skip one stave and drive staples in the rear quarter of the next stave adjacent to the loop on the hoop. Then staples are driven in the center of each stave following until the hooks of the hoops again approach the stapling-machines. To effect this stapling of the hoops, the length of the teeth in the ratchet is varied, as described. The normal teeth $y^2$ are a half an inch long. The short teeth $v^2$ are three-eighths of an inch long. Consequently the short teeth will only turn the drum three-fourths of the distance of the normal teeth before the pawls are disengaged by the cam and the drum is in position for the staple to be driven in the first quarter of the stave. (See Fig. 14$^a$.) As the drum has made only three-fourths movement forward with the short teeth it has left the next or normal tooth $y^2$ following back one-fourth of the position of a normal tooth. Consequently when this tooth is pushed forward it moves the drum forward once and a quarter the normal distance, or to the center of the next stave $x'$, Fig. 14$^a$. Now as no staples are driven in this stave the pin of the pitman $i^3$, Figs. 13 and 16, is disengaged from the hole $n^3$ in the crank $k^3$ by the projections $o^3$ on the end of the drum passing under the pitman $i^3$ and springing it out of operative connection with the crank $k^3$, so as not to drive a staple in this stave, but allowing the pawls $z^2$ to bring forward the next or long tooth $w^2$ of the ratchet. This tooth is five-eighths of an inch long, or a quarter longer than the normal tooth. Consequently it moves the drum one-quarter farther forward than normal, the projection $o^3$ has passed the pitman, and the pitman again operatively engaged the lever, and the stapling-machine driving the staples on the rear quarter of the stave $x^2$, as shown in Fig. 14$^a$.

The battery of four stapling-machines (see Fig. 21) are arranged so that the two that are over the outer end hoops E are one stave in advance of the two machines that are over the two intermediate hoops, and all the stapling-machines are connected together to make and drive staples simultaneously. Consequently when one machine of the battery jumps or skips a stave all the other three machines do so at the same time.

Having thus fully described my invention, what I claim is—

1. In a machine for making and driving staples, a head provided with a bifurcated jaw, one part of which bends the wire and the other part drives the staple; in combination with a die for severing the wire.

2. In a machine for making and driving staples, a head provided with a bifurcated jaw, one part of which bends the wire and the other part drives the staple, and a guide for the staple; in combination with a die for severing the wire.

3. In a machine for making and driving staples, a head provided with a bifurcated jaw, one part of which bends the wire and the other part drives the staple, and a spring-actuated guide for the staple; in combination with a die for severing the wire.

4. In a machine for making and driving staples, a head having a bifurcated jaw, one part of which bends the wire and the other part drives the staple, a guide presser-foot having a vertical slot, and a horizontal trip with which the driving-arm engages; in combination with a die for severing the wire.

5. In a machine for making and driving staples, a head having a bifurcated jaw, one part of which bends the wire and the other part drives the staple, a guide presser-foot having a vertical and a horizontal slot, and a yielding trip in the latter slot with which the driving-arm engages; in combination with a die for severing the wire.

6. In a machine for making and driving staples, a head having a bifurcated jaw, one part of which bends the wire and the other part drives the staple, a guide presser-foot having a vertical and a horizontal slot and a bifurcated spring-trip in the latter slot with which the driving-arm engages; in combination with a die for severing the wire.

7. In a machine for making and driving staples, a head having a bifurcated arm, one part of which bends the wire and the other part drives the staple, and is distended laterally at its end, a guide presser-foot having a vertical and a horizontal slot and a yielding trip contracted at one end in the latter slot; in combination with a die for severing the wire.

8. In a machine for making and driving staples, a head having a bifurcated arm, one part of which bends the wire and the other part drives the staple, and a two-part die for severing the wire; in combination with a vertically-movable guide presser-foot having a vertical slot and grooves for the staple.

9. In a machine for making and driving staples, an arm for bending and driving staples, and a two-part die for severing the wire, one of which is fixed and the other movable; in combination with a vertically-movable guide presser-foot having a vertical slot and grooves on opposite sides of the slot.

10. In a machine for making and driving staples, an arm for bending and driving staples, a two-part die for severing the wire, one of which is fixed and the other movable, and a cam for operating the latter die; in combination with a vertically-movable guide presser-foot having a vertical and a horizontal slot and a trip in the latter slot.

11. In a machine for making and driving staples, a head having a bifurcated arm, one part of which bends the wire and the other part drives the staple and provided with suitable gear on its outer edge and above said arm, a guide for the staple and a die for severing the wire; in combination with a transmitter provided with teeth engaging the gear on the head, and means for driving said transmitter.

12. In a machine for making and driving staples, a head having a bifurcated arm, one part of which bends the wire and the other part drives the staple, and means for imparting intermittent motion to said head; in combination with a guide for the staple, and means for severing the wire.

13. In a machine for making and driving staples, a head having a bifurcated arm, one part of which bends the wire and the other part drives the staple, a two-part die for severing the wire and a vertically-movable slotted guide presser-foot; in combination with a transmitter and a wire-feeding device.

14. In a machine for making and driving staples, a head having gear-teeth on its edge and provided with a bifurcated arm, one part of which bends the wire and the other part drives the staple, a transmitter engaging the teeth on said head, a die, and a vertically-movable and vertically-slotted guide presser-foot; in combination with a wire-feeding device, a cam and connections between said cam, the die and the feeding device.

15. In a machine for making and driving staples, a head having a bifurcated arm, a vertically-movable guide presser-foot, and a die; in combination with a wire-feeding device having telescopic sections and provided with automatic oppositely-arranged gripping devices.

16. In a machine for making and driving staples, a wire-feeding device consisting of two telescopic tubular sections, each provided with automatic oppositely-arranged gripping devices.

17. In a machine for making and driving staples, a wire-feeding device consisting of two telescopic tubular sections, one of which is provided with a longitudinal slot and the other with a pin engaging said slot, a cage on each section and a spring-actuated gripping-disk in each cage.

18. In a machine for making and driving staples, a wire-feeding device consisting of two telescopic tubular sections, each provided with cages having inclined bearing-surfaces, a circular disk engaging said surface and the wire, and a spring engaging the disk.

19. A plurality of machines for making and driving staples arranged in a battery and in different vertical planes; in combination with a revoluble assembling-drum, and means for effecting an intermission of the action of the stapling-machines for each feed of a predetermined number of staves.

20. A plurality of machines for making and driving staples arranged in a battery and in different vertical planes; in combination with a revoluble stave-assembling drum having spurs on its periphery, a laterally-movable stave-feeding device, a connection between the feeding device and the drum for moving the discharge end thereof in the direction of the travel of the drum, means for returning said feeding device, and means connected with the drum for effecting an intermission of the action of the stapling-machines for each feed of a predetermined number of staves.

21. A plurality of machines for making and driving staples; in combination with a revoluble stave-assembling drum made in sections, the center section having spurs on its periphery, and the end sections having a projection to engage the croze of the stave and a stave-feeding device.

22. A plurality of machines for making and driving staples; in combination with a revoluble stave-assembling drum made in sections, the center section having spurs on its periphery, and the end sections having a projection to engage the croze of the staves, studs or pins on the ends of the center sections, a stave-feeding device pivotally supported, and a lever at each end of the feeding device engaging the studs on the drum.

23. A plurality of machines for making and driving staples, arranged in a battery, the end machines being in advance of the intermediate machines and all the machines driven from the same source of power; in combination with a stave-assembling drum provided with means for effecting an intermission of the action of the stapling-machines for each feed of a predetermined number of staves.

24. A plurality of machines for making and driving staples arranged in a battery, and operated synchronously; in combination with a stave-assembling drum provided with a ratchet-wheel having teeth of different lengths opposite each other, and intermediate teeth of the same length, a ratchet or pawl normally engaging the teeth of the ratchet-wheel and connected to the stapling-machine, and a cam arranged to disengage the pawl from the teeth at specified intervals for each feed of a predetermined number of staves.

25. A plurality of machines for making and driving staples arranged in a battery and operated synchronously; in combination with a stave-assembling drum provided with a ratchet at each end having teeth of different lengths opposite each other, and intermediate teeth of the same length, a compound pawl normally engaging the teeth of the ratchet, a double-ended cam arranged to disengage the pawl from the teeth at specified intervals, a link connected to the bar of the pawl at one end and to a crank connected to the stapling-machine at the opposite end, and means for disengaging said link in said crank, at specified intervals.

In testimony whereof I affix my signature in presence of two witnesses.

OLIVER H. P. CORNELL.

Witnesses:
ANDERSON PRICE,
CHAS. H. BEAER.